US009229267B2

(12) United States Patent
Hong et al.

(10) Patent No.: US 9,229,267 B2
(45) Date of Patent: Jan. 5, 2016

(54) LIQUID CRYSTAL LENS PANEL COMPRISING A LIQUID CRYSTAL LAYER HAVING A REFRACTIVE INDEX OF 0.2 TO 0.29 AND A DIELECTRIC CONSTANT OF 5.5 F/M TO 10 F/M AND DISPLAY DEVICE HAVING THE SAME

(71) Applicant: Samsung Display Co., Ltd., Yongin (KR)

(72) Inventors: Sung Hwan Hong, Suwon-si (KR); Suk Choi, Seongnam-si (KR); Sujin Kim, Seoul (KR); Hyeokjin Lee, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 454 days.

(21) Appl. No.: 13/836,047

(22) Filed: Mar. 15, 2013

(65) Prior Publication Data
US 2013/0278847 A1 Oct. 24, 2013

(30) Foreign Application Priority Data

Apr. 18, 2012 (KR) .................. 10-2012-0040396

(51) Int. Cl.
G02F 1/13 (2006.01)
G02F 1/1335 (2006.01)
G02F 1/29 (2006.01)
G02F 1/1343 (2006.01)

(52) U.S. Cl.
CPC ........ *G02F 1/133526* (2013.01); *G02F 1/1313* (2013.01); *G02F 1/29* (2013.01); *G02F 2001/134345* (2013.01); *G02F 2001/294* (2013.01)

(58) Field of Classification Search
CPC G02F 1/133526; G02F 1/29; G02F 2001/294
USPC .................. 349/15, 167, 201, 202
See application file for complete search history.

(56) References Cited

U.S. PATENT DOCUMENTS

| 5,762,825 | A | 6/1998 | Tsubata et al. |
| 6,819,317 | B1 * | 11/2004 | Komura et al. ............... 345/204 |
| 7,058,252 | B2 | 6/2006 | Woodgate et al. |
| 7,522,340 | B2 | 4/2009 | Kim et al. |
| 2006/0109399 | A1 | 5/2006 | Kubota et al. |
| 2008/0204548 | A1 | 8/2008 | Goulanian et al. |
| 2010/0079686 | A1 | 4/2010 | Kawakami |
| 2011/0063533 | A1 | 3/2011 | Kim et al. |
| 2011/0157496 | A1 | 6/2011 | Im |
| 2011/0228181 | A1 * | 9/2011 | Jeong et al. ..................... 349/15 |

FOREIGN PATENT DOCUMENTS

| JP | 07-082183 | 3/1995 |
| JP | 2001-097938 | 10/2001 |

(Continued)

*Primary Examiner* — Paul Lee
(74) *Attorney, Agent, or Firm* — H.C. Park & Associates, PLC

(57) ABSTRACT

A liquid crystal lens panel includes a first substrate including a first base substrate and a first electrode layer disposed on the first base substrate; a second substrate including a second base substrate facing the first base substrate and a second electrode layer disposed on a surface of the second base substrate, the second substrate facing the first base substrate; and a liquid crystal layer disposed between the first substrate and the second substrate. The liquid crystal layer has a refractive index of about 0.2 to about 0.29 and a dielectric constant of about 5.5 F/m to about 10 F/m.

19 Claims, 6 Drawing Sheets

(56) References Cited

FOREIGN PATENT DOCUMENTS

| JP | 2005-239871 | 9/2005 |
|---|---|---|
| JP | 2007-277127 | 10/2007 |
| JP | 2010-275463 | 12/2010 |
| KR | 10-2008-0102755 | 11/2008 |
| KR | 10-2009-0004006 | 1/2009 |

* cited by examiner

LIQUID CRYSTAL LENS PANEL COMPRISING A LIQUID CRYSTAL LAYER HAVING A REFRACTIVE INDEX OF 0.2 TO 0.29 AND A DIELECTRIC CONSTANT OF 5.5 F/M TO 10 F/M AND DISPLAY DEVICE HAVING THE SAME

CROSS-REFERENCE TO RELATED APPLICATION

This application claims priority from and the benefit of Korean Patent Application No. 10-2012-0040396, filed on Apr. 18, 2012, which is incorporated herein by reference for all purposes as if fully set forth herein.

BACKGROUND

1. Field

The present disclosure relates to a liquid crystal lens panel and a display device having the same. More particularly, the present disclosure relates to a liquid crystal lens panel capable of improving a display quality of a three-dimensional (3D) image and a display device having the same.

2. Discussion of the Background

A 3D image display typically provides a left-eye image and a right-eye image having a binocular disparity, to a left eye and a right eye of a viewer, respectively. The viewer sees the images with both eyes and mixes the images together in brain and perceive the 3D image.

For the 3D image, a 3D image display device employing a linear polarization method, which separates the left-eye image and the right-eye image from each other using 3D glasses, has been suggested, but the viewer bears inconvenience of wearing 3D glasses.

SUMMARY OF THE INVENTION

The present disclosure provides a liquid crystal lens panel capable of improving a display quality of a 3D image.

The present disclosure provides a display device having the liquid crystal lens panel.

Exemplary embodiments of the present disclosure provide a liquid crystal lens panel which includes a first substrate including a first base substrate and a first electrode layer disposed on the first base substrate; a second substrate including a second base substrate facing the first base substrate and a second electrode layer disposed on a surface of the second base substrate, the second substrate facing the first base substrate; and a liquid crystal layer disposed between the first substrate and the second substrate. The liquid crystal layer has a refractive index of about 0.2 to about 0.29 and a dielectric constant of about 5.5 F/m to about 10 F/m.

Exemplary embodiments of the present disclosure provide a display device which includes a display panel to display an image; and a liquid crystal lens panel to convert the image to two-dimensional image or a three-dimensional image. The liquid crystal lens panel includes: a first substrate including a first base substrate and a first electrode layer disposed on the first base substrate; a second substrate including a second base substrate facing the first base substrate and a second electrode layer disposed on a surface of the second base substrate, the second substrate facing the first base substrate; and a liquid crystal layer disposed between the first substrate and the second substrate. The liquid crystal layer has a refractive index of about 0.2 to about 0.29 and a dielectric constant of about 5.5 F/m to about 10 F/m.

According to the above, the liquid crystal lens panel and the display device may improve display quality of the 3D image.

It is to be understood that both the foregoing general description and the following detailed description are exemplary and explanatory and are intended to provide further explanation of the invention as claimed.

BRIEF DESCRIPTION OF THE DRAWINGS

The above and other advantages of the present invention will become readily apparent by reference to the following detailed description when considered in conjunction with the accompanying drawings.

DETAILED DESCRIPTION OF THE ILLUSTRATED EMBODIMENTS

Figure 1:
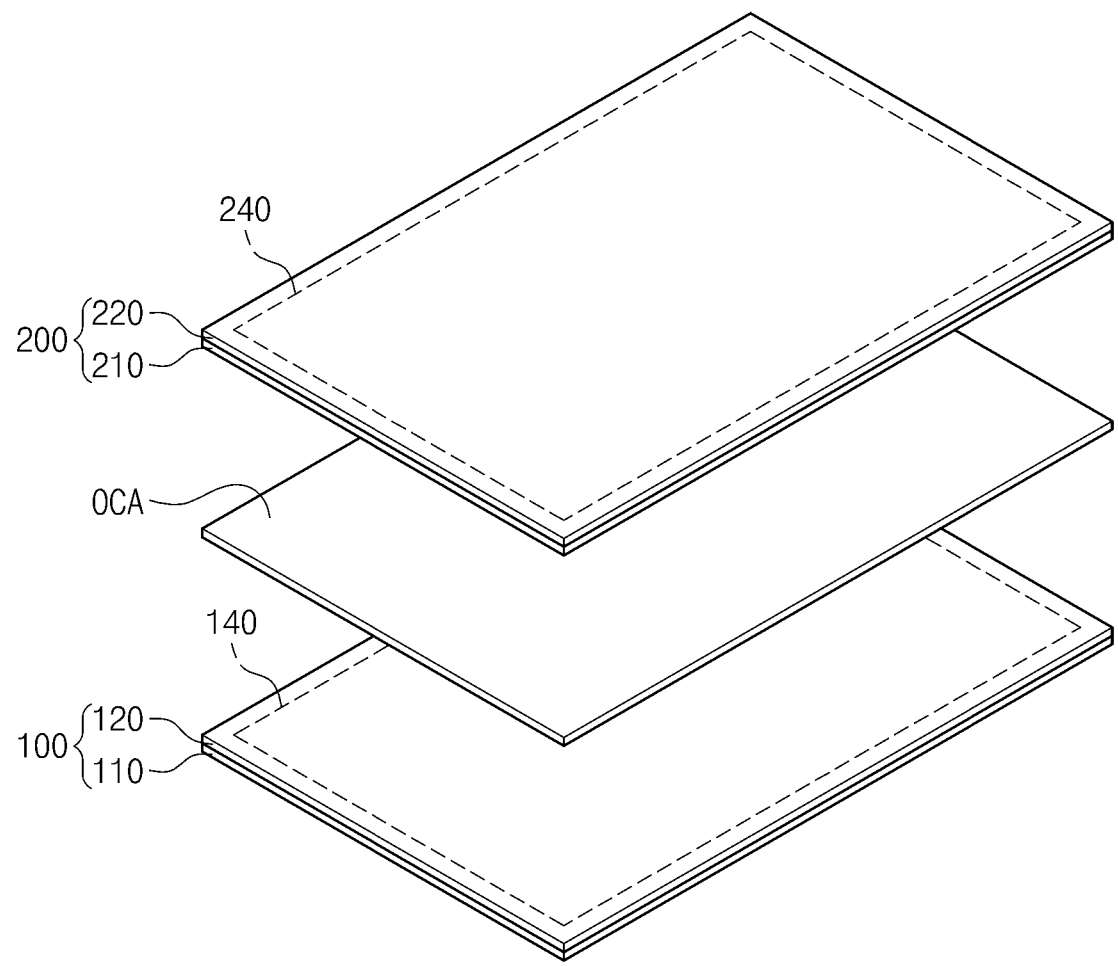
FIG. 1 is an exploded perspective view showing a display device according to an exemplary embodiment of the present invention.

The present invention will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

In the drawings, the thickness of layers, films, panels, regions, etc., may be exaggerated for clarity. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. In contrast, It will be understood that when an element such as a layer, film, region, or substrate is referred to as being "beneath" another element, it can be directly beneath the other element or intervening elements may also be present. Meanwhile, when an element is referred to as being "directly beneath" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, the present invention will be explained in detail with reference to the accompanying drawings.

Figure 2:
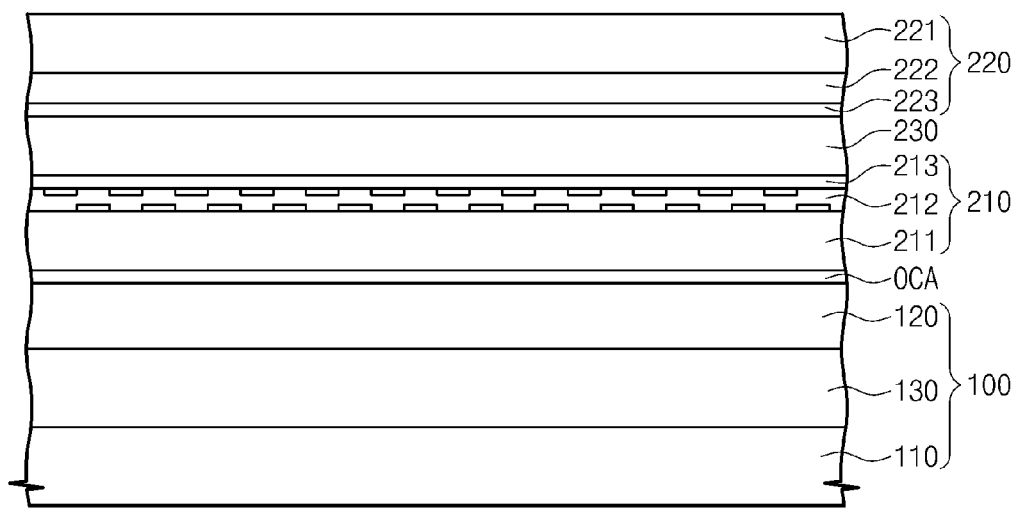
FIG. 2 is a cross-sectional view showing a display panel and a liquid crystal lens panel of the display device shown in FIG. 1.

FIG. 1 is an exploded perspective view showing a display device according to an exemplary embodiment of the present invention, and FIG. 2 is a cross-sectional view showing a display panel and a liquid crystal lens panel of the display device shown in FIG. 1.

Referring to FIG. 1 and FIG. 2, a display device includes a display panel 100 and a liquid crystal lens panel 200. The display panel 100 and the liquid crystal lens panel 200 are coupled to each other using an adhesive member through which light passes. For instance, an optically clear adhesive (OCA) is disposed between the display panel 100 and the liquid crystal lens panel 200 as the adhesive member, and thus the display panel 100 and the liquid crystal lens panel 200 may be coupled to each other. In the present exemplary embodiment, the OCA includes an optically transparent adhesive, so that the OCA has transparency and adhesive force.

The display panel 100 displays an image to provide the viewer with the image. The display panel 100 may be, but not limited to, various display panels, such as an organic light emitting display panel, a plasma display panel, a liquid crystal display panel, an electrophoretic display panel, an electrowetting display panel, etc. In a non-self-emissive display panel such as a liquid crystal display panel, an electrophoretic display panel, or an electrowetting display panel, the display device further includes a backlight unit (not shown) to provide light to the display panel 100. In the present exemplary embodiment, a liquid crystal display panel will be described as the display panel 100 as a representative example.

The display panel 100 has a rectangular-plate shape with long sides and short sides, and displays the image through a display area 140. In addition, the display panel 100 includes an array substrate 110, an opposite substrate 120 facing the array substrate 110, and a first liquid crystal layer 130 disposed between the array substrate 110 and the opposite substrate 120.

The array substrate 110 includes a plurality of pixels arranged in a matrix form. A light blocking layer may be disposed between the pixels to prevent interference of the light passing through each pixel so as to improve a contrast ratio of the display panel 100. In addition, each pixel includes a gate line (not shown) extending in a first direction substantially in parallel with a side of the array substrate 110, a data line (not shown) extending in a second direction crossing the first direction and insulated from the gate line, and a pixel electrode (not shown). In addition, each pixel includes a thin film transistor (not shown) electrically connected to the gate line, the data line, and the pixel electrode. The thin film transistor switches a driving signal applied to the pixel electrode.

In addition, a driver IC (not shown) is disposed adjacent to a side of the array substrate 110. The driver IC receives various signals from an external source (not shown), and outputs the driving signal to the thin film transistor in response to the various signals to drive the display panel 100.

The opposite substrate 120 includes RGB color filters (not shown) disposed thereon to realize predetermined colors using the light provided from the backlight unit 300 and a common electrode (not shown) disposed on the RGB color filters to face the pixel electrode. The RGB color filters may be formed by a thin film process. While the RGB color filters are illustrated as being disposed on the opposite substrate 120, the position of the RGB color filters should not be limited thereto. For instance, the RGB color filters may be disposed on the array substrate 110.

The first liquid crystal layer 130 includes liquid crystal molecules. The liquid crystal molecules are aligned in a specific direction by voltages respectively applied to the pixel electrode and the common electrode so as to control the transmittance of the light provided from the backlight unit 300. As a result, the display panel 100 displays a desired image.

The liquid crystal lens panel 200 may convert the image displayed on the display panel 100 to a 2D image or a 3D image. The liquid crystal lens panel 200 is disposed at a side in which the light exiting from the display panel 100 travels, and the liquid crystal lens panel 200 has a transmission area 240 at a location corresponding to the display area 140. In this case, the transmission area 240 transmits the image displayed in the display area 140. In addition, the liquid crystal lens panel 200 has a shape corresponding to that of the display panel 100. That is, the liquid crystal lens panel 200 has a rectangular-plate shape with long sides and short sides in conformity with the shape of the display panel 100.

The liquid crystal lens panel 200 includes a plurality of lens parts LP, and the lens parts LP separate the image displayed on the display panel 100 to a left-eye image and a right-eye image.

The liquid crystal lens panel 200 includes a first substrate 210 disposed closer to the display panel 100, a second substrate 220 facing the display panel 100 while interposing the first substrate 210 between the second substrate 220 and the display panel 100, and a second liquid crystal layer 230 disposed between the first substrate 210 and the second substrate 220.

The first substrate 210 includes a first base substrate 211, a first electrode layer 212 disposed on the first base substrate 211, and a first alignment layer 213 disposed on the first electrode layer 212.

The second substrate 220 includes a second base substrate 221, a second electrode layer 222 disposed on the second base substrate 221, and a second alignment layer 223 disposed on the second electrode layer 222.

The first electrode layer 212 and the second electrode layer 222 include a plurality of electrode patterns. In addition, the electrode patterns may be made of a transparent conductive oxide, such as indium tin oxide (ITO) or indium zinc oxide (IZO). Accordingly, the first electrode layer 212 and the second electrode layer 222 form an electric field in response to voltages respectively applied thereto, along which liquid crystal molecules in the second liquid crystal layer 230 are aligned.

The first alignment layer 213 and the second alignment layer 223 control the initial alignment of the liquid crystal molecules of the liquid crystal layer. Thus, since the first alignment layer and the second alignment layer pre-determines the alignment direction of the liquid crystal molecules, the liquid crystal molecules may be rapidly aligned.

The second liquid crystal layer 230 may be aligned in various modes, such as a vertical alignment mode, a horizontal alignment mode, etc. In addition, in the initial alignment state of the second liquid crystal layer 230, it is possible that a long axis of the liquid crystal molecules is not twisted between the first substrate 210 and the second substrate 220.

In the present exemplary embodiment, the second liquid crystal layer 230 may have a refractive index of about 0.2 to about 0.29, a dielectric constant of about 5.5 F/m to about 10 F/m, and a thickness of about 2.2 μm to about 10 μm.

Figure 3:
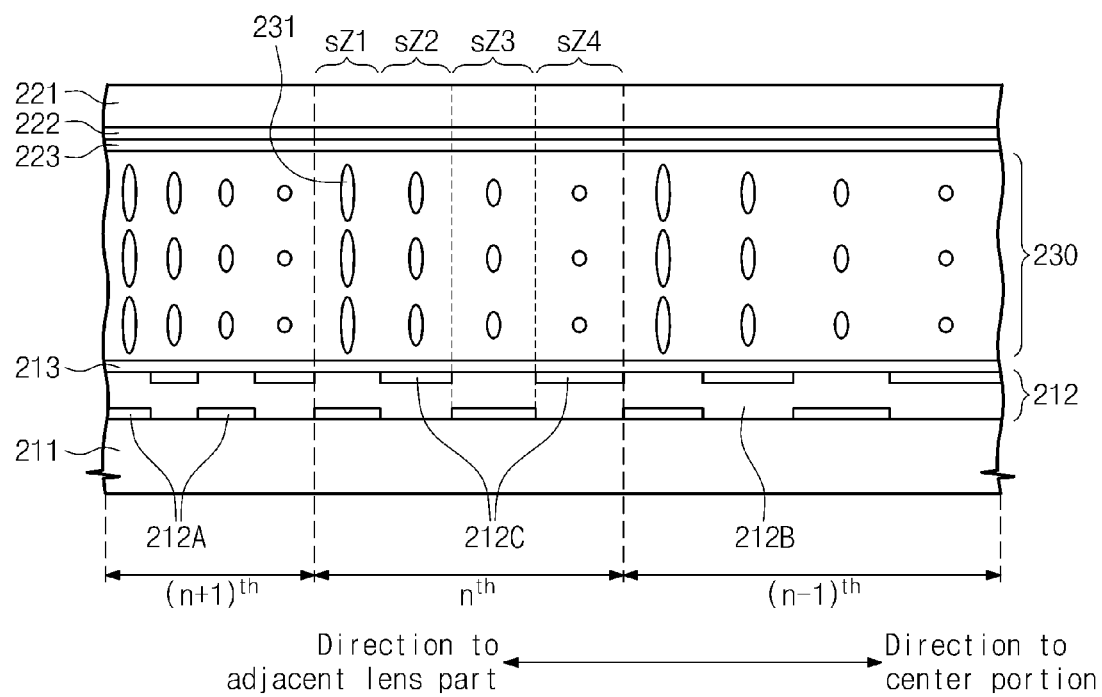
FIG. 3 is a cross-sectional view illustrating the liquid crystal lens panel shown in FIG. 1 and FIG. 2.
Figure 4:
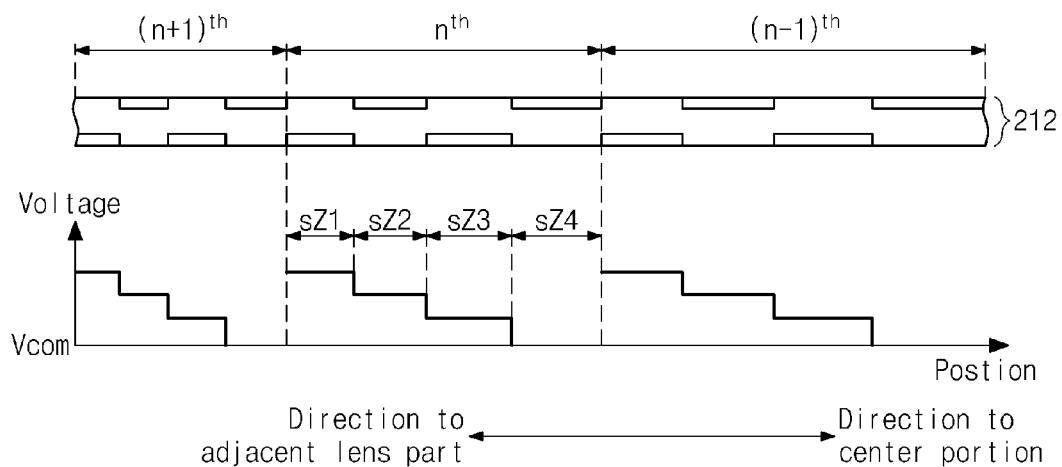
FIG. 4 is a view showing a voltage applied to a first electrode layer of the liquid crystal lens panel shown in FIG. 3.
Figure 5:
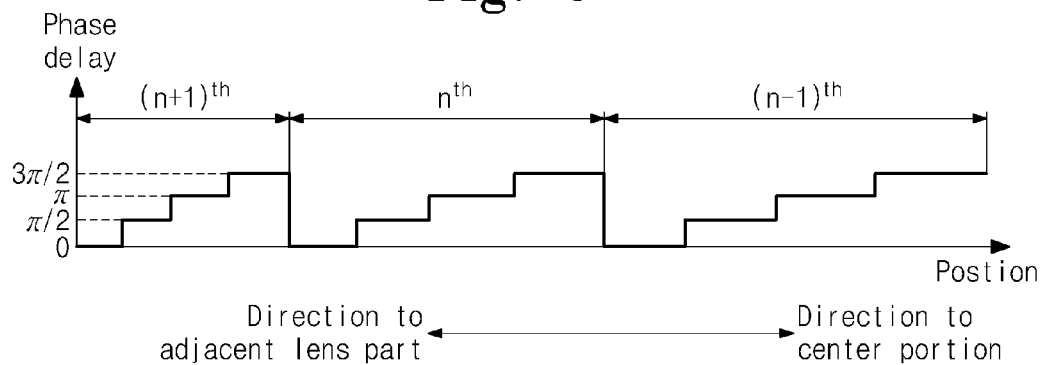
FIG. 5 is a view showing a phase delay in each sub-area of the liquid crystal lens panel shown in FIG. 3.
Figure 6:
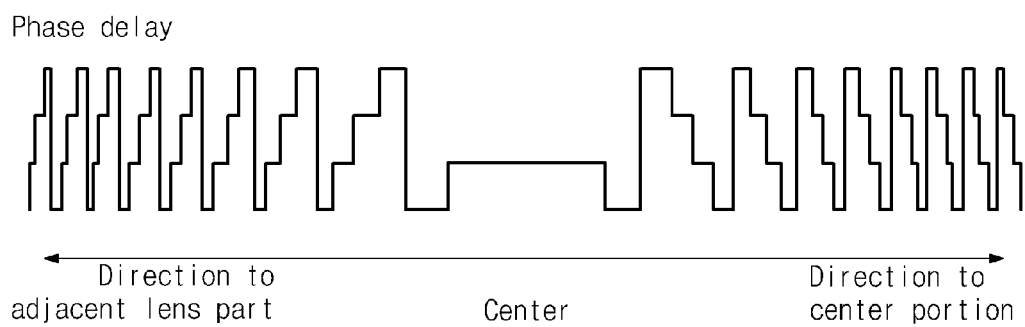
FIG. 6 is a view showing a phase delay included in one period of the liquid crystal lens panel shown in FIG. 3.

FIG. 3 is a cross-sectional view illustrating the liquid crystal lens panel shown in FIG. 1 and FIG. 2; FIG. 4 is a view showing a voltage applied to a first electrode layer of the liquid crystal lens panel shown in FIG. 3; FIG. 5 is a view showing a phase delay in each sub-area of the liquid crystal lens panel shown in FIG. 3; and FIG. 6 is a view showing a phase delay included in one period of the liquid crystal lens panel shown in FIG. 3.

Referring to FIG. 3, FIG. 4, FIG. 5, and FIG. 6, the liquid crystal lens panel 200 includes the first substrate 210, the second substrate 220, and the second liquid crystal layer 230 disposed between the first substrate 210 and the second substrate 220.

The first substrate 210 includes the first base substrate 211, the first electrode layer 212 disposed on the first base substrate 211, and the first alignment layer 213 disposed on the first electrode layer 212. The first electrode layer 212 includes a plurality of first electrode patterns 212A disposed on the first base substrate 211, an insulating layer 212B that covers the first electrode patterns 212A, and a plurality of second electrode patterns 212C disposed on the insulating layer 212B.

The first electrode patterns 212A and the second electrode patterns 212C may have stripe shapes extending in a direction substantially parallel with the long sides or the short sides of the liquid crystal lens panel 200. Alternatively, the first electrode patterns 212A and the second electrode patterns 212C may have stripe shapes extending in an inclined direction with respect to the long sides or the short sides of the liquid crystal lens panel 200.

Alternatively, the first electrode patterns 212A may be alternately arranged with the second electrode patterns 212C and substantially in parallel with the second electrode patterns 212C in a same plane. That is, the first electrode patterns 212A may be arranged so that they are not overlapped with the second electrode patterns 212C when viewed from above.

The insulating layer 212B may include a transparent inorganic insulating material or a transparent organic insulating material to electrically insulate the first electrode patterns 212A from the second electrode patterns 212C.

The second substrate 220 includes the second base substrate 221, the second electrode layer 222 disposed on the second base substrate 221, and the alignment layer 223 disposed on the second electrode layer 222. The second electrode layer 222 may be the common electrode disposed on the surface of the second base substrate 221, which faces the first base substrate 211.

Meanwhile, the first alignment layer 213 and the second alignment layer 223 may be rubbed or light-aligned in the direction substantially parallel with the direction in which the first electrode patterns 212A and the second electrode patterns 212C, or inclined to such direction. The rubbing direction or the light-alignment direction of the first alignment layer 213 may be opposite to that of the second alignment layer 223.

The liquid crystal molecules 231 of the second liquid crystal layer 230 may be initially aligned in the direction substantially parallel with the surfaces of the first substrate 210 and the second substrate 220. However, the initial alignment direction of the liquid crystal molecules 231 should not be limited to such direction. For instance, the liquid crystal molecules 231 of the second liquid crystal layer 230 may be initially aligned in a direction substantially vertical to the surfaces of the first substrate 210 and the second substrate 220.

Meanwhile, the liquid crystal lens panel 200 includes the lens part and each lens part serves as a Fresnel lens. Each of the lens parts LP may have a lens axis substantially in parallel with the direction in which the first electrode patterns 212A and the second electrode patterns 212C extend. In addition, each of the lens parts LP may include a plurality of Fresnel areas.

In more detail, the distances between adjacent first electrode patterns 212A and the distances between adjacent second electrode patterns 212C decrease as they are closer to a boundary of the lens part from a center portion of the lens part LP. As an example, as shown in FIG. 3, each of an (n−1)th Fresnel area and an n-th Fresnel area includes two first electrode patterns 212A and two second electrode patterns 212C. In addition, the distance between the first electrode patterns 212A and between the second electrode patterns 212C in the (n−1)th Fresnel area are widest, and the distance between the first electrode patterns 212A and between the second electrode patterns 212C in an (n+1)th Fresnel area are narrowest.

In addition, each of the Fresnel areas may include a plurality of sub-areas sZ1, sZ2, sZ3, and sZ4. For instance, each of the Fresnel areas may include four sub-areas sZ1, sZ2, sZ3, and sZ4, each of which corresponding to areas in which the first and second electrode patterns 212A and 212C are disposed. That is, each of the Fresnel areas may include a first sub-area sZ1, a second sub-area sZ2, a third sub-area sZ3, and a fourth sub-area sZ4.

In the present exemplary embodiment, each of the first electrode patterns 212A and each of the second electrode patterns 212C have a width equal to or smaller than 10 μm in each Fresnel area. As an example, while not limited thereto, each of the first electrode patterns 212A and each of the second electrode patterns 212C may have a width equal to or smaller than 5 μm.

Meanwhile, the widths of the first electrode patterns 212A and the second electrode patterns 212C may be equal to or greater than the thickness of the second liquid crystal 230, e.g., a distance between the first substrate 210 and the second substrate 220. Accordingly, the thickness of the second liquid crystal layer 230 may be equal to or smaller than 10 μm. As an example, while not limited thereto, the thickness of the second liquid crystal layer 230 may be equal to or smaller than 5 μm.

Hereinafter, an operation of the liquid crystal lens panel 200 will be described with reference to a lens part of the liquid crystal lens panel 200.

The second electrode layer 222 is applied with a common voltage Vcom, and the first and second electrode patterns 212A and 212C of the first electrode layer 212 are applied with a step-shaped voltage. The amplitude of the step-shaped voltage to the first and second electrode patterns 212A and 212C increases as the first and second electrode patterns 212A and 212C are closer to the center portion of the lens part from a boundary between adjacent lens parts LP. For instance, as shown in FIG. 4, the first electrode patterns 212A in the first sub-area sZ1 are applied with the common voltage Vcom, the second electrode patterns 212C in the second sub-area sZ2 are applied with a voltage at a first level, the first electrode patterns 212A in the third sub-area sZ3 are applied with a voltage at a second level, and the second electrode patterns 212C in the fourth sub-area sZ4 is applied with a voltage at a third level. Accordingly, in each Fresnel area, the first electrode patterns 212A disposed in the same sub-area or the second electrode patterns 212C disposed in the same sub-area are applied with the voltage to delay the light incident to the re-aligned liquid crystal molecules with the same phase.

As described above, when the voltages are applied to the first electrode layer 212 and the second electrode layer 222, an electric field is generated between the first substrate 210 and the second substrate 220. Due to the electric field, the liquid crystal molecules 231 of the second liquid crystal layer 230 are realigned as shown in FIG. 3. That is, assuming the liquid crystal molecules 231 of the second liquid crystal layer 230 are initially aligned in the horizontal direction, the liquid crystal molecules 231 in the fourth sub-area sZ4 are aligned in the horizontal direction with respect to the surfaces of the first and second substrates 210 and 220, and the alignment of the liquid crystal molecules 231 are closer to the vertical direction with respect to the surfaces of the first and second substrates 210 and 220 as the liquid crystal molecules 231 are closer to the first sub-area sZ1 from the third sub-area sZ3. In the present exemplary embodiment, the liquid crystal molecules 231 of the second liquid crystal layer 230 are aligned in the horizontal direction in the initial state, but the alignment of the liquid crystal molecules 231 should not be limited to the horizontal direction. That is, the liquid crystal molecules 231 of the second liquid crystal layer 230 may be aligned in the vertical direction in the initial state.

Thus, the phase delay value of the light passing through the liquid crystal lens panel 200 varies depending on which sub-areas sZ1, sZ2, sZ3, and sZ4 the light passes through as shown in FIG. 5. That is, the phase delay value of the light gradually becomes larger stepwise in each sub-area sZ1, sZ2, sZ3, and sZ4 of the liquid crystal lens panel 200 as the light is closer to the center portion of the lens part LP. Accordingly, each of the lens parts LP may serve as the Fresnel lens. Meanwhile, as the level of the voltage applied to the first electrode patterns 212A and the second electrode pattern 212C becomes larger, the phase delay of the light passing through the second liquid crystal layer 230 becomes smaller, but it should not be limited thereto or thereby. Depending on the exemplary embodiments, as the level of the voltage applied to the first electrode patterns 212A and the second electrode pattern 212C becomes smaller, the phase delay of the light passing through the second liquid crystal layer 230 may become larger.

As described above, the liquid crystal lens panel 200 controls the voltages applied to the second electrode layer 222, the first electrode patterns 212A, and the second electrode patterns 212C, and thus the phase delay value of the liquid crystal layer 230 varies in a multi-level value as shown in FIG. 6. Accordingly, one lens part may form one phase modulation type Fresnel lens. Therefore, the liquid crystal lens panel 200 may refract the light to be concentrated on a focus position using various properties of light, e.g., diffraction and destructive and constructive interferences.

Meanwhile, if the voltages applied to the first electrode patterns 212A and the second electrode patterns 212C are the same, it may possible that the second liquid crystal layer 230 does not operate as the Fresnel lens to transmit all the light. Accordingly, the liquid crystal lens panel 200 may allow a 2D image generated by the display panel 100 to be perceived by the left-eye and the right-eye.

As described above, according to the present exemplary embodiment, the liquid crystal lens panel 200 utilizes the principle of the Fresnel lens so as to reduce the thickness of the second liquid crystal layer 230 of the liquid crystal lens panel 200, i.e., the cell gap between the first and second substrates 210 and 220. Accordingly, the liquid crystal lens panel 200 may easily control the liquid crystal molecules 231. In addition, since the surfaces of the first and second substrates 210 and 220, which make contact with the second liquid crystal layer 230, are substantially flat, the liquid crystal lens panel 200 may improve the uniformity of the alignment of the second liquid crystal layer 230.

Figure 7:
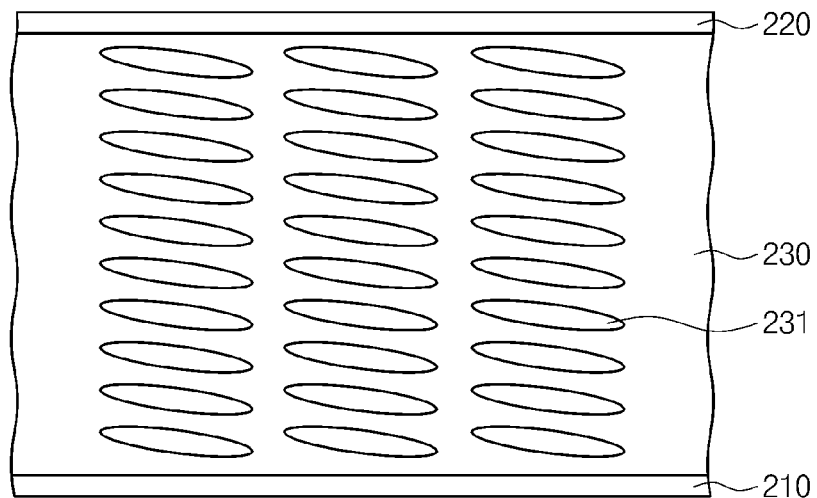
FIG. 7 is a cross-sectional view showing an initial alignment state of a second liquid crystal layer of the liquid crystal lens panel shown in FIG. 1 and FIG. 2.
Figure 8:
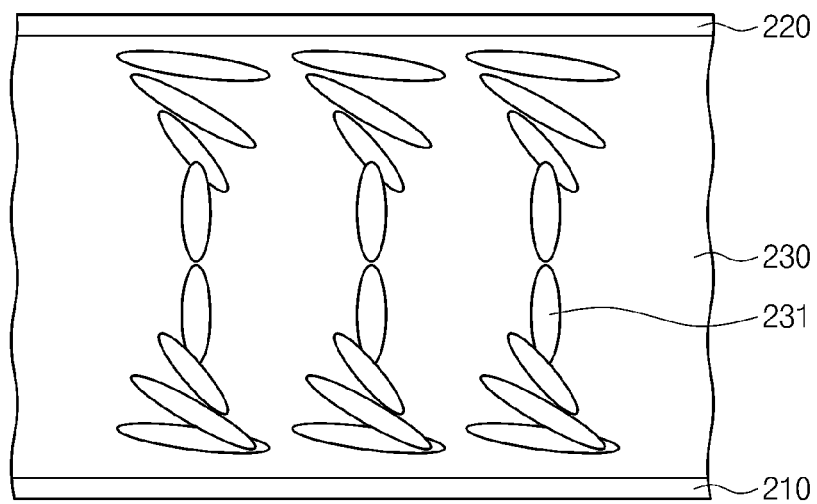
FIG. 8 is a cross-sectional view showing an alignment state of a second liquid crystal layer of the liquid crystal lens panel shown in FIG. 1 and FIG. 2 according to an electric field.
Figure 9:
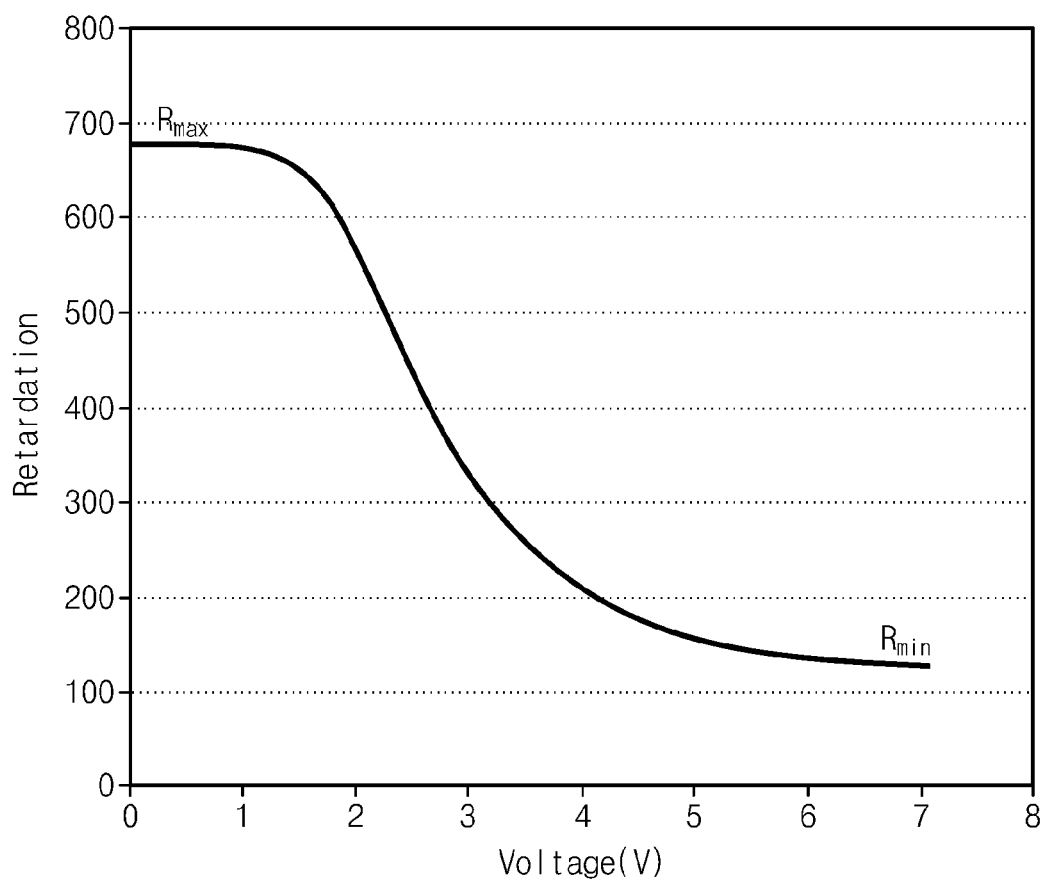
FIG. 9 is a graph explaining a phase delay of a light passing through the second liquid crystal layer of the liquid crystal lens panel according to a voltage applied to the liquid crystal lens panel.

FIG. 7 is a cross-sectional view showing an initial alignment state of a second liquid crystal layer of the liquid crystal lens panel shown in FIG. 1 and FIG. 2, FIG. 8 is a cross-sectional view showing an alignment state of a second liquid crystal layer of the liquid crystal lens panel shown in FIG. 1 and FIG. 2 according to an electric field, and FIG. 9 is a graph explaining a phase delay of a light passing through the second liquid crystal layer of the liquid crystal lens panel according to a voltage applied to the liquid crystal lens panel. In this case, the second liquid crystal layer 230 has a refractive index of about 0.29 and the light has a wavelength of about 550 nm.

Referring to FIG. 7, the liquid crystal molecules 231 of the second liquid crystal layer 230 are inclined with respect to the surface of the first and second substrates 210 and 220 in the initial state after the rubbing or light-alignment process. For instance, the liquid crystal molecules 231 are inclined at an angle of about 5 to about 6 degrees in the initial state with respect to the surface of the first and second substrates 210 and 220. Accordingly, the phase delay value of the light passing through the second liquid crystal layer 230 may be greater than the wavelength of the light incident into the second liquid crystal layer 230.

For example, when the liquid crystal molecules 231 of the second liquid crystal layer 230 are inclined at the angle of about 5 to about 6 degrees in the initial alignment state and the wavelength of the light incident into the second liquid crystal layer 230 is about 550 nm, the second liquid crystal layer 230 phase-delays the light as shown in FIG. 9. That is, a maximum phase delay value Rmax of the light passing through the second liquid crystal layer 230 may be about 680 nm.

Referring to FIG. 8, when an electric field is generated between the first substrate 210 and the second substrate 220, the liquid crystal molecules 231 of the second liquid crystal layer 230 are realigned by the electric field. In this case, the liquid crystal molecules 231 may be realigned in the vertical direction to the surface of the first and second substrates 210 and 220.

However, the alignment of the liquid crystal molecules 231 is not completely vertical to the surface of the first and second substrates 210 and 220. That is, the phase variation of the light occurs while the light passes through the second liquid crystal layer 230. The phase of the light passing through the second liquid crystal layer 230 is delayed by more than zero.

For instance, as shown in FIG. 9, when the liquid crystal molecules 231 are realigned by the electric field and the light at the wavelength of about 550 nm is incident into the second liquid crystal layer 230, a minimum phase delay value Rmin of the light passing through the second liquid crystal layer 230 may be about 130 nm greater than zero.

However, as shown in FIG. 9, In case the minimum phase delay value Rmin of the light passing through the second liquid crystal layer 230 is equal to or greater than 100 nm, a distortion of an image occurs in the display device employing the liquid crystal lens panel. This is because the minimum phase delay value Rmin passing through the second liquid crystal layer 230 is equal to or greater than 100 nm. Accordingly, the second liquid crystal layer 230 may have the minimum phase delay value Rmin smaller than 100 nm for better performance.

Meanwhile, a difference between the maximum phase delay value Rmax and the minimum phase delay value Rmin of the light passing through the second liquid crystal layer 230 of the liquid crystal lens panel 200 may be equal to or similar to the wavelength of the light passing through the second liquid crystal layer 230. That is, the maximum phase delay value Rmax and the minimum phase delay value Rmin of the light passing through the second liquid crystal layer 230 satisfy the following Equation.

$$Rmax-Rmin \approx \lambda \qquad \text{Equation}$$

In Equation, λ denotes the wavelength of the light passing through the second liquid crystal layer 230. Rmax denotes the maximum phase delay value of the light passing through the second liquid crystal layer 230 and Rmin denotes the minimum phase delay value of the light passing through the second liquid crystal layer 230. In detail, Rmax denotes the phase delay value of the light passing through the second liquid crystal layer 230 when no electric field is generated in the liquid crystal lens panel 200, and Rmin denotes the phase delay value of the light passing through the second liquid crystal layer 230 when the electric field is generated in the liquid crystal lens panel 200.

Thus, since the second liquid crystal layer 230 employed in the liquid crystal lens panel 200 has the minimum phase delay value Rmin greater than zero, the initial phase delay value of the second liquid crystal layer 230 may be greater than 550 nm.

Figure 10:
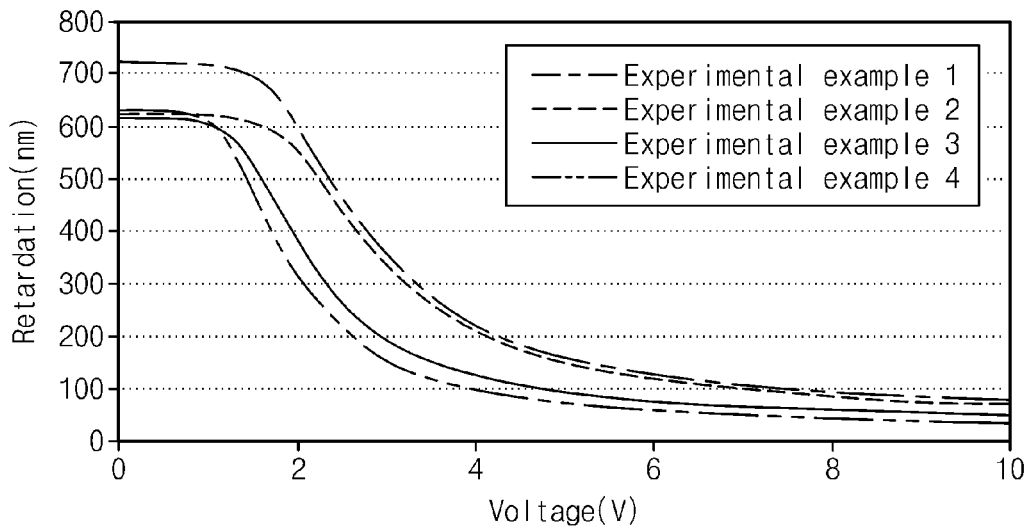
FIG. 10 is a graph showing a phase variation of the light passing through the liquid crystal layer employed in the liquid crystal lens panel according to a dielectric constant of the liquid crystal layer.

FIG. 10 is a graph showing a phase variation of the light passing through the liquid crystal layer employed in the liquid crystal lens panel according to a dielectric constant of the liquid crystal layer, and Table 1 shows the phase delay of the light in accordance with the refractive index and the dielectric constant of the liquid crystal layer. The maximum phase delay value Rmax and the minimum phase delay value Rmin of experimental examples 1, 2, 3, and 4 are measured when the light at the wavelength of about 550 nm passes through the liquid crystal layers.

TABLE 1

| | Experimental example 1 | Experimental example 1 | Experimental example 1 | Experimental example 1 |
|---|---|---|---|---|
| Refractive index (Δn) | 0.29 | 0.29 | 0.29 | 0.29 |
| Thickness (μm) | 2.793 | 2.443 | 2.442 | 2.426 |
| Initial phase delay value (nm) | 810.04 | 708.4 | 708.12 | 703.64 |
| Dielectric constant (F/m) | 5.5 | 5.5 | 8.0 | 10.0 |
| Rmax (nm) | 723.03 | 623.26 | 623.36 | 633.67 |
| Rmin (nm) | 74.59 | 67.26 | 46.31 | 35.18 |
| Effective phase delay value (nm) | 648.45 | 556 | 577.05 | 598.49 |

Referring to FIG. 10 and Table 1, the initial phase delay value dΔn of the liquid crystal layer used in the liquid crystal lens panel is obtained by multiplying the thickness of the liquid crystal layer and the refractive index of the liquid crystal layer. In addition, the effective phase delay value may be the difference between the maximum phase delay value Rmax and the minimum phase delay value Rmin of the light passing through the liquid crystal layer.

The initial phase delay value dΔn is an ideal value related to the phase variation of the light passing through the liquid crystal layer and is obtained when the liquid crystal molecules of the liquid crystal layer are aligned in the direction completely in parallel to the surface of the liquid crystal lens panel, from which the light exits. However, the maximum phase delay value Rmax of the light passing through the liquid crystal layer may be different from the initial phase delay value dΔn. This is because the liquid crystal molecules of the liquid crystal layer are not aligned in the direction completely in parallel to the surface of the liquid crystal lens panel, from which the light exits.

Meanwhile, since the minimum phase delay value Rmin is equal to or smaller than 100 nm in experimental examples 1 to 4, the liquid crystal layer in experimental examples 1 to 4 may be employed in the liquid crystal lens panel.

In addition, according to experimental examples 1 and 2, as the thickness of the liquid crystal layer becomes smaller, the minimum phase delay value Rmin is decreased with the same refractive index and the same dielectric constant of the liquid crystal layer. That is, the minimum phase delay value Rmin is decreased as the initial phase delay value becomes smaller. This is because the initial phase delay value of experimental example 2 is smaller than the initial phase delay value of experimental example 1. Here, smaller minimum phase delay value Rmin means that the phase variation of the light passing through the liquid crystal layer is small. Thus, the phase variation of the light passing through the liquid crystal layer of experimental example 2 is relatively smaller than that of the light passing through the liquid crystal layer of experimental example 1, and the light passing through the liquid crystal layer of experimental example 2 has the phase similar to that of the light incident into the liquid crystal layer of experimental example 2. Therefore, in the display device employing the liquid crystal lens panel including the liquid crystal layer of experimental example 2, the distortion of the image is smaller in amount when compared to that of experimental example 1.

In addition, according to experimental examples 2 and 4, as the dielectric constant of the liquid crystal layer becomes larger, the minimum phase delay value Rmin is decreased with the same refractive index and the same thickness of the liquid crystal layer. Thus, the distortion of the image may be smaller in the display device that employs the liquid crystal lens panel including the liquid crystal layer with the relatively greater dielectric constant.

Meanwhile, as shown in FIG. 10, as the dielectric constant of the liquid crystal layer becomes larger, the liquid crystal molecules of the liquid crystal layer are realigned by the electric field even though the applied voltages for the electric field are lowered. Accordingly, as the dielectric constant becomes larger, the thickness of the liquid crystal layer is reduced.

In addition, although the thickness of the liquid crystal layer is the same, the distortion of the image in the display device may be reduced when the liquid crystal layer having high dielectric constant is employed in the display device.

Figure 11:
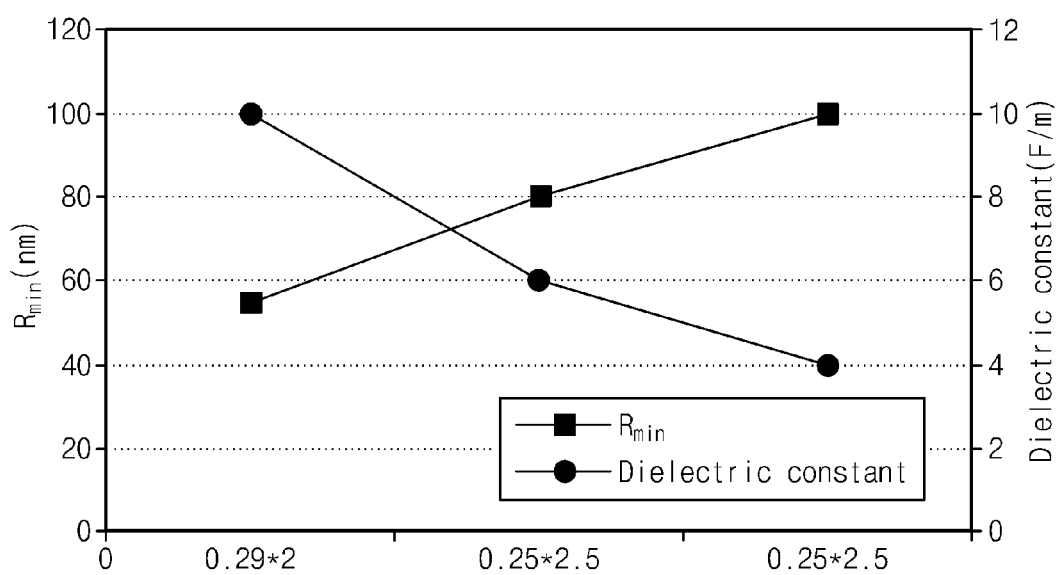
FIG. 11 is a graph explaining a minimum phase delay value according to a refractive index and a dielectric constant of a liquid crystal layer employed in the liquid crystal lens panel.

FIG. 11 is a graph explaining a minimum phase delay value according to a refractive index and a dielectric constant of a liquid crystal layer employed in the liquid crystal lens panel, and Table 2 shows the variation of the minimum phase delay value Rmin in accordance with the dielectric constant of the liquid crystal layer and the thickness of the liquid crystal layer. The minimum phase delay value Rmin of experimental examples 5 to 10 are measured when the light at the wavelength of about 550 nm passes through the liquid crystal layers.

TABLE 2

|  | Experimental example 5 | Experimental example 6 | Experimental example 7 | Experimental example 8 | Experimental example 9 | Experimental example 10 |
|---|---|---|---|---|---|---|
| Refractive index ($\Delta n$) | 0.29 | 0.29 | 0.25 | 0.25 | 0.25 | 0.25 |
| Thickness ($\mu m$) | 2 | 2.5 | 2.5 | 2.4 | 2.5 | 2.3 |
| Initial phase delay value ($d\Delta n$) | 580 nm | 696 nm | 625 nm | 600 nm | 625 nm | 575 nm |
| Dielectric constant (F/m) | 5.5 | 5.5 | 8 | 8 | 10 | 10 |
| Rmin (nm) | 100 | 68.83 | 60 | 47.6 | 40 | 26.9 |

Referring to FIG. 11 and Table 2, in case the refractive index and the thickness of the liquid crystal layer are uniform, the minimum phase delay value Rmin is decreased as the dielectric constant of the liquid crystal layer becomes larger. In addition, when the refractive index and the thickness of the liquid crystal layer are the same, the minimum phase delay value Rmin is decreased as the thickness of the liquid crystal layer becomes smaller.

In more detail, the initial phase delay value in experimental example is about 580 nm and the initial phase delay value in experimental examples 7 and 9 is about 625 nm. However, although the initial phase delay value in experimental example 5 is smaller than the initial phase delay value in experimental examples 7 and 9, the minimum phase delay value Rmin in experimental example 5 may be greater than the minimum phase delay value Rmin in experimental examples 7 and 9. That is, as the dielectric constant of the liquid crystal layer becomes larger, the minimum phase delay value Rmin is decreased.

Meanwhile, the initial phase delay value in experimental example 5 is about 580 nm and the minimum phase delay value Rmin in experimental example 5 is about 100 nm. However, since the maximum phase delay value of the liquid crystal layer in experimental example 5 is smaller than about 580 nm, the liquid crystal layer in experimental example 5 is less suited to be employed in the liquid crystal lens panel. Accordingly, when the dielectric constant of the liquid crystal layer is about 5.5 F/m as shown in experimental example 6, the liquid crystal layer may have the thickness equal to or greater than about 2.5 μm for better performance.

As shown in experimental examples 7 and 8, when the refractive index of the liquid crystal layer is about 0.25 and the dielectric constant of the liquid crystal layer is about 8 F/m, the thickness of the liquid crystal layer may be equal to or greater than about 2.4 μm.

As shown in experimental examples 9 and 10, when the refractive index of the liquid crystal layer is about 0.25 and the dielectric constant of the liquid crystal layer is about 10 F/m, the thickness of the liquid crystal layer may be equal to or greater than about 2.3 μm.

Consequently, the liquid crystal layer employed in the liquid crystal lens panel has the refractive index of about 0.25 to about 0.29, the dielectric constant of about 5.5 to about 10 F/m, and the thickness of about 2.3 μm.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal lens panel, comprising:
   a first substrate comprising a first base substrate and a first electrode layer disposed on the first base substrate;
   a second substrate comprising a second base substrate facing the first base substrate and a second electrode layer disposed on a surface of the second base substrate, the second substrate facing the first base substrate; and
   a liquid crystal layer disposed between the first substrate and the second substrate,
   wherein the liquid crystal layer has a refractive index of about 0.2 to about 0.29 and a dielectric constant of about 5.5 F/m to about 10 F/m.

2. The liquid crystal lens panel of claim 1, wherein the liquid crystal layer has a thickness equal to or greater than about 2.3 μm and equal to or smaller than about 10 μm.

3. The liquid crystal lens panel of claim 2, wherein the liquid crystal layer has the thickness equal to or greater than about 2.3 μm and equal to or smaller than about 5 μm.

4. The liquid crystal lens panel of claim 2, wherein the second electrode layer comprises:
   a plurality of first electrode patterns disposed on the second base substrate; and
   a plurality of second electrode patterns alternately arranged with the first electrode patterns and insulated from the first electrode patterns.

5. The liquid crystal lens panel of claim 4, wherein the second electrode layer further comprises an insulating layer to cover the first electrode patterns.

6. The liquid crystal lens panel of claim 4, wherein each of the first electrode patterns and each of the second electrode patterns have a thickness equal to or greater than the thickness of the liquid crystal layer.

7. The liquid crystal lens panel of claim 2, wherein the thickness of the liquid crystal layer is equal to or greater than about 2.5 μm, the refractive index of the liquid crystal layer is about 0.29, and the dielectric constant of the liquid crystal layer is about 5.5 F/m.

8. The liquid crystal lens panel of claim 2, wherein the thickness of the liquid crystal layer is equal to or greater than about 2.4 μm, the refractive index of the liquid crystal layer is about 0.25, and the dielectric constant of the liquid crystal layer is about 8.0 F/m.

9. The liquid crystal lens panel of claim 2, wherein the thickness of the liquid crystal layer is equal to or greater than about 2.3 μm, the refractive index of the liquid crystal layer is about 0.25, and the dielectric constant of the liquid crystal layer is about 10 F/m.

10. A display device, comprising:
a display panel to display an image; and
a liquid crystal lens panel to convert the image to a two-dimensional image or a three-dimensional image, the liquid crystal lens panel comprising:
a first substrate comprising a first base substrate and a first electrode layer disposed on the first base substrate,
a second substrate comprising a second base substrate facing the first base substrate and a second electrode layer disposed on a surface of the second base substrate, the second substrate facing the first base substrate, and
a liquid crystal layer disposed between the first substrate and the second substrate,
wherein the liquid crystal layer has a refractive index of about 0.2 to about 0.29 and a dielectric constant of about 5.5 F/m to about 10 F/m.

11. The display device of claim 10, wherein the liquid crystal layer has a thickness equal to or greater than about 2.3 μm and equal to or smaller than about 10 μm.

12. The display device of claim 11, wherein the liquid crystal layer has the thickness equal to or greater than about 2.3 μm and equal to or smaller than about 5 μm.

13. The display device of claim 12, wherein the second electrode layer comprises:
a plurality of first electrode patterns disposed on the second base substrate; and
a plurality of second electrode patterns alternately arranged with the first electrode patterns and insulated from the first electrode patterns.

14. The display device of claim 13, wherein the second electrode layer further comprises an insulating layer to cover the first electrode patterns.

15. The display device of claim 13, wherein each of the first electrode patterns and each of the second electrode patterns have a thickness equal to or greater than the thickness of the liquid crystal layer.

16. The display device of claim 11, wherein the thickness of the liquid crystal layer is equal to or greater than about 2.5 μm, the refractive index of the liquid crystal layer is about 0.29, and the dielectric constant of the liquid crystal layer is about 5.5 F/m.

17. The display device of claim 11, wherein the thickness of the liquid crystal layer is equal to or greater than about 2.4 μm, the refractive index of the liquid crystal layer is about 0.25, and the dielectric constant of the liquid crystal layer is about 8.0 F/m.

18. The display device of claim 11, wherein the thickness of the liquid crystal layer is equal to or greater than about 2.3 μm, the refractive index of the liquid crystal layer is about 0.25, and the dielectric constant of the liquid crystal layer is about 10 F/m.

19. The display device of claim 10, further comprising an optically clear adhesive disposed between the display panel and the liquid crystal lens panel.

* * * * *